United States Patent [19]

Calbeck

[11] 4,133,865
[45] * Jan. 9, 1979

[54] PROCESS FOR PREPARING METALLIC SULPHATES

[75] Inventor: John H. Calbeck, Pratt, Kans.

[73] Assignee: W. J. Trust; J. R. Calbeck, Trustees, Pratt, Kan.

[*] Notice: The portion of the term of this patent subsequent to Sep. 9, 1992, has been disclaimed.

[21] Appl. No.: 376,449

[22] Filed: Jul. 5, 1973

[51] Int. Cl.$^2$ .............. C01G 9/06; C01G 3/10; C01C 1/26; C01B 17/64

[52] U.S. Cl. .................. 423/106; 423/45; 423/99; 423/148; 423/514; 423/544; 423/420; 423/557; 423/558

[58] Field of Search ............ 423/544, 545, 557, 558, 423/561, 420, 45, 99, 148, 542, 566

[56] References Cited

U.S. PATENT DOCUMENTS

| | | | |
|---|---|---|---|
| 826,925 | 7/1906 | Enke | 423/99 |
| 1,004,361 | 9/1911 | Bueb | 423/420 |
| 1,083,253 | 12/1913 | Hall | 423/571 |
| 1,133,636 | 3/1915 | Hall | 423/571 |
| 1,862,828 | 6/1932 | Robson | 423/110 |
| 1,889,942 | 12/1932 | Baehr | 423/545 |
| 1,905,604 | 4/1933 | Queweau | 423/110 |
| 2,009,733 | 7/1935 | Hechenbliekwer | 423/542 |
| 2,074,210 | 3/1937 | Calbeck | 423/544 |
| 2,927,001 | 3/1960 | McCullough | 423/541 A |
| 3,042,498 | 7/1962 | Norman | 423/542 |
| 3,674,427 | 7/1972 | Welty, Jr. | 423/541 |

Primary Examiner—O. R. Vertiz
Assistant Examiner—Gary P. Straub
Attorney, Agent, or Firm—John H. Widdowson

[57] ABSTRACT

An improved process for preparing a metallic sulphate in a reaction zone from mixing of the corresponding metallic sulphide concentrates with ammonium sulphate and heating. Heating preferably includes directly contacting the mixture with products of combustion of a heating fuel at temperatures between about 150° C and about 480° C. The products of combustion may be diluted with a gas, and the metallic sulphate of the corresponding metallic sulphide may be initially mixed with the mixture to inhibit the development of semi-fluid conditions in the reaction of the metallic sulphide concentrates with ammonium sulphate.

18 Claims, 4 Drawing Figures

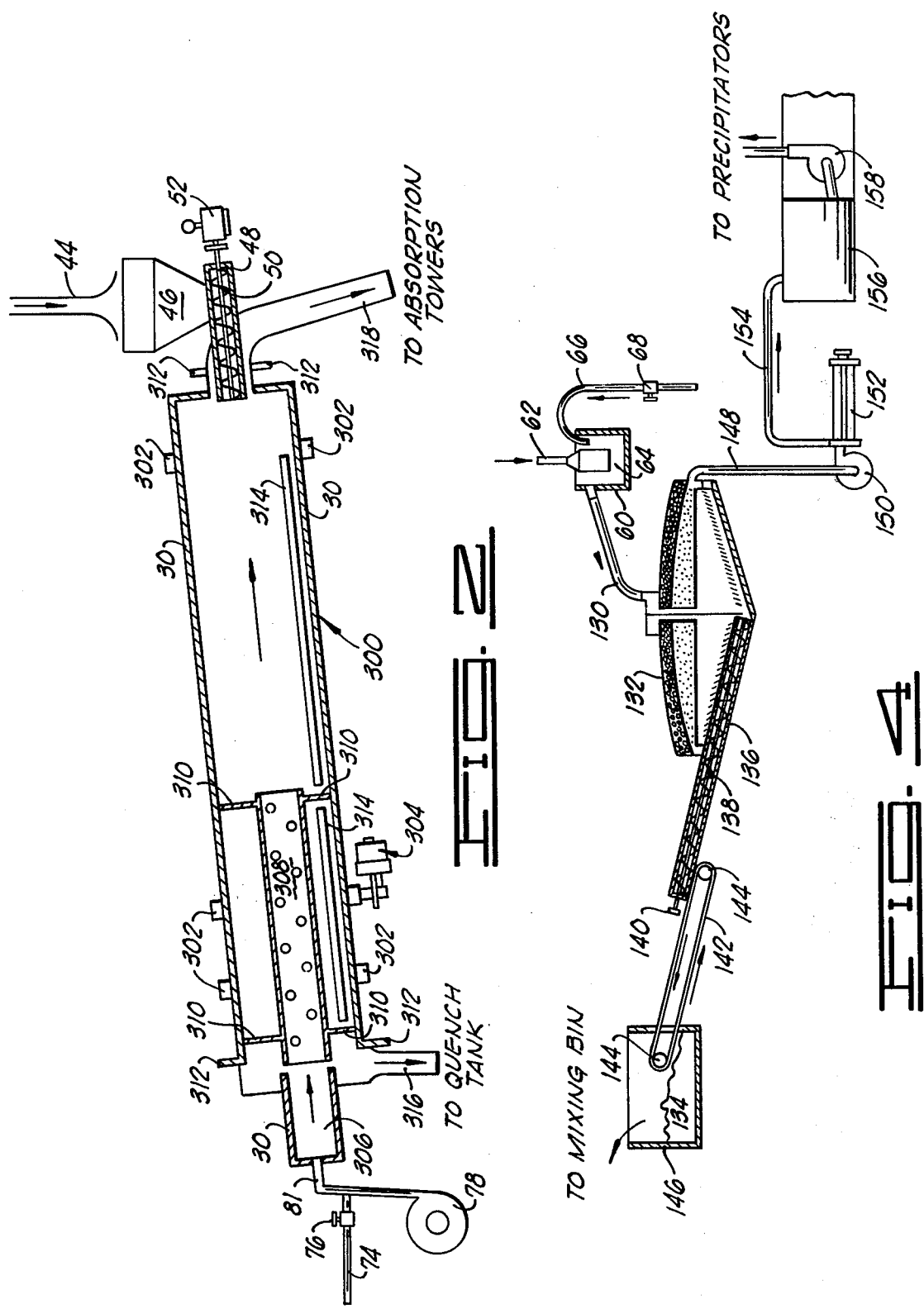

PROCESS FOR PREPARING METALLIC SULPHATES

BACKGROUND OF THE INVENTION

1. Field of the Invention

This invention is related to a process for preparing metallic sulphates. More specifically, this invention provides an improved process for preparing metallic sulphates from mixing of metallic sulphide ores, such as sphalerite, galena, chalcocite, pyrite, etc. with ammonium sulphate.

2. Description of the Prior Art

Production of metallic sulphates, such as zinc sulphate in calcining furnaces, is generally old in the art and has been disclosed in my U.S. Pat. No. 2,006,259 patented June 25, 1935, No. 2,074,210 patented Mar. 16, 1937, No. 3,443,888 patented May 13, 1969, and No. 3,672,830 patented June 27, 1972, all of which will be incorporated into this application. These patents disclose a cyclic process wherein when crystals of ammonium sulphate are calcined with zinc sulphide ores, the reaction commences at a temperature between about 150° C. and 200° C. with a slow fusion and decomposition of ammonium sulphate to ammonium bisulphate and ammonia as represented by Reaction (1).

$$(NH_4)_2SO_4 \xrightarrow[150°C]{\Delta} NH_4HSO_4 + NH_3 \qquad (1)$$

As the temperature approaches 200° C. the ammonium bisulphate begins to react with zinc sulphide to produce an anhydrous zinc sulphate sinter residue and vaporous ammonium products, such as S, $SO_2$ and $NH_3$, as illustrated by the following reaction:

$$2NH_4HSO_4 + ZnS \xrightarrow[300°C]{\Delta} ZnSO_4 + S + SO_2 + 2NH_3 + 2H_2O \qquad (2)$$

The volatile S, $SO_2$ and $NH_3$ are dissolved in water and purified to produce solutions of ammonium thiosulphate and ammonium hydroxide.

When the temperature is maintained at approximately 440° C. for about 10 minutes all of the ammonium bisulphate has reacted with zinc sulphide and only anhydrous zinc sulphate and unreacted zinc sulphide remain. The anhydrous zinc sulphate residue, or sinter, is dissolved in water, purified and produces a concentrated solution of zinc sulphate which when combined with the ammonium thiosulphate and ammonium hydroxide produces zinc sulphide pigments and ammonium sulphates in accordance with the equation:

$$ZnSO_4 + (NH_4)_2S_2O_3 + 2NH_4(OH) \rightarrow ZnS + 2(NH_4)_2SO_4 + H_2O \qquad (3)$$

Thus, a cyclic process is provided when ammonium sulphate of Equation (3) is recovered and returned to react with the zinc sulphide of Reaction (2). The preferred specific embodiment of this cyclic process was fully disclosed and patented on May 13, 1969, in my U.S. Pat. No. 3,443,888. The sinc sulphide pigment of Equation (3) may subsequently be washed, dried, and dehydrated by calcining at a low temperature to produce a superior zinc sulphide pigment as disclosed and patented on June 27, 1972, in my U.S. Pat. No. 3,672,830.

It has been discovered that the reaction of Equation (3) can be controlled precisely and efficiencies of 95% or higher can be obtained. However, Reactions (1) and (2) are beset with many interfering side reactions that result in low efficiency in the production of zinc sulphate and objectionable by-products in the gaseous products which tend to throw the cyclic process out of balance and greatly increase the cost of operation.

If air infiltrates into a calcining furnace while a mixture of a metallic sulphide ore, such as zinc sulphide, and ammonium sulphate are being treated, a portion of evolved elemental sulphur is oxidized as shown in Equation (4) below resulting in ammonium thiosulphate and ammonium hydroxide recoveries being reduced and a build up in the system of ammonium sulphite.

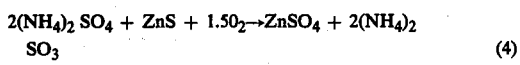
$$2(NH_4)_2SO_4 + ZnS + 1.5O_2 \rightarrow ZnSO_4 + 2(NH_4)_2SO_3 \qquad (4)$$

The ammonium sulphite has to subsequently be removed and additionally treated with elemental sulfur for conversion into ammonium thiosulphate before it can be used for production of zinc sulphide pigments as aforementioned. Infiltration of air can be corrected by calcining in a tight furnace or a retort externally fired which has been provided with seals to prevent ingress of air, but these furnaces must be manufactured with expensive alloys and are susceptible to corrosion by the ammonium acid sulphate produced from the fusion and decomposition of ammonium sulphate of Reaction (1). The fused mixture forms a viscous pasty mass which remains semi-fluid and sticky until Reaction (1) is more than half complete. This necessitates the use of tumbling rails within the calcining furnace in order to break up the sticky, pasty lumps and keep the charged mixture moving through the furnace.

Another objectionable side reaction is the sulphiding of the newly formed zinc sulphate with the elemental sulfur of Reaction (2) in accordance with the following equation:

$$ZnSO_4 + 2S \rightarrow ZnS + 2SO_2 \qquad (5)$$

This side reaction develops quickly as the temperature approaches 300° C. because sulphur is a liquid at this temperature. Liquid sulphur prolongs the semi-fluid condition of the pasty charge to additionally hinder the progression of the charge through a calcining furnace. This side reaction also reduces the production of zinc sulphate, or any metallic sulphate of the corresponding metallic sulphide ore, and produces an excess of ammonium sulphite in the volatile products.

The extent of which all of these hereinbefore side reactions throw the cyclic operation out of balance may be indicated by comparing the equivalents of free ammonia and the elemental sulfur collected with the water soluble zinc sulphate produced. If the molar ratios of ammonia to zinc sulphate, or sulphur to zinc sulphate, equal unity then the cyclic process is 100% efficient. In practice wich conventional processes, the efficiency for producing zinc sulphate varies from between 0% to 80%.

Therefore, what is needed is an improved efficient process for preparing metallic sulphates from the mixing of metallic sulphide ores with ammonium sulphate which overcomes all of the foregoing deficiencies and side reactions associated with prior art processes. More specifically, what is needed is an improved process for preparing zinc sulphate which is particularly adapted for combination with the known apparatuses and processes of refining zinc sulphate in accordance with Reactions (1) and (2).

SUMMARY OF THE INVENTION

The present invention accomplishes its desired objects by broadly providing an improved process of preparing a metallic sulphate from mixing of the corresponding metallic sulphide concentrates with ammonium sulphate and heating the mixture to yield the metallic sulphate, evolved sulphur, sulphur dioxide, ammonia, and water. The improvement comprises heating the mixture by directly contacting the mixture with products of combustion of a heating fuel. The metallic sulphate may initially be added before heating to the mixture of the corresponding metallic sulphide and ammonium sulphate to inhibit the development of semi-fluid conditions in the reaction of the metallic sulphide concentrates with the ammonium sulphate. Heating may be done at a temperature between about 150° C. and 480° C., and a diluent gas may additionally be added to the products of combustion. A raw fuel gas may be also added above the mixture being heated and the volatile sulphur, sulphur dioxide and ammonia may be subsequently dissolved in water in an absorption tower to produce solutions of ammonium thiosulphate and ammonia hydroxide.

Therefore, it is an object of the present invention to provide an improved process for producing a metallic sulphate, such as zinc sulphate.

It is another object of this invention to provide an improved process for producing a metallic sulphate that eliminates or reduces both the physical and the chemical difficulties encountered in heating a mixture of a corresponding metallic sulphide ores and ammonium sulphate by conventional processes and apparatuses.

It is yet another object of this invention to provide an improved process for increasing the production of a metallic sulphate over conventional processes which heat a mixture of a corresponding metallic sulphide ore and ammonium sulphate.

It is still yet another object of this invention to provide a process for producing metallic sulphate which makes possible an efficiency better than 95%, and one which is relatively economical to install in convention apparatuses and process.

These together with various ancillary objects and features which will become apparent to those skilled in the art as the following description proceeds, are attained by this improved process, a preferred embodiment being shown with reference to the accompanying drawings, by way of example only, wherein:

BRIEF DESCRIPTION OF THE DRAWINGS

FIG. 2 is a schematic of a rotary kiln which may operate certain embodiments of my improved process;

FIG. 4 is a schematic of the preferred apparatuses for separating the metallic sulphates from the unreacted corresponding metallic sulphides in the improved process.

DETAILED DESCRIPTION OF THE INVENTION

Figure 1:
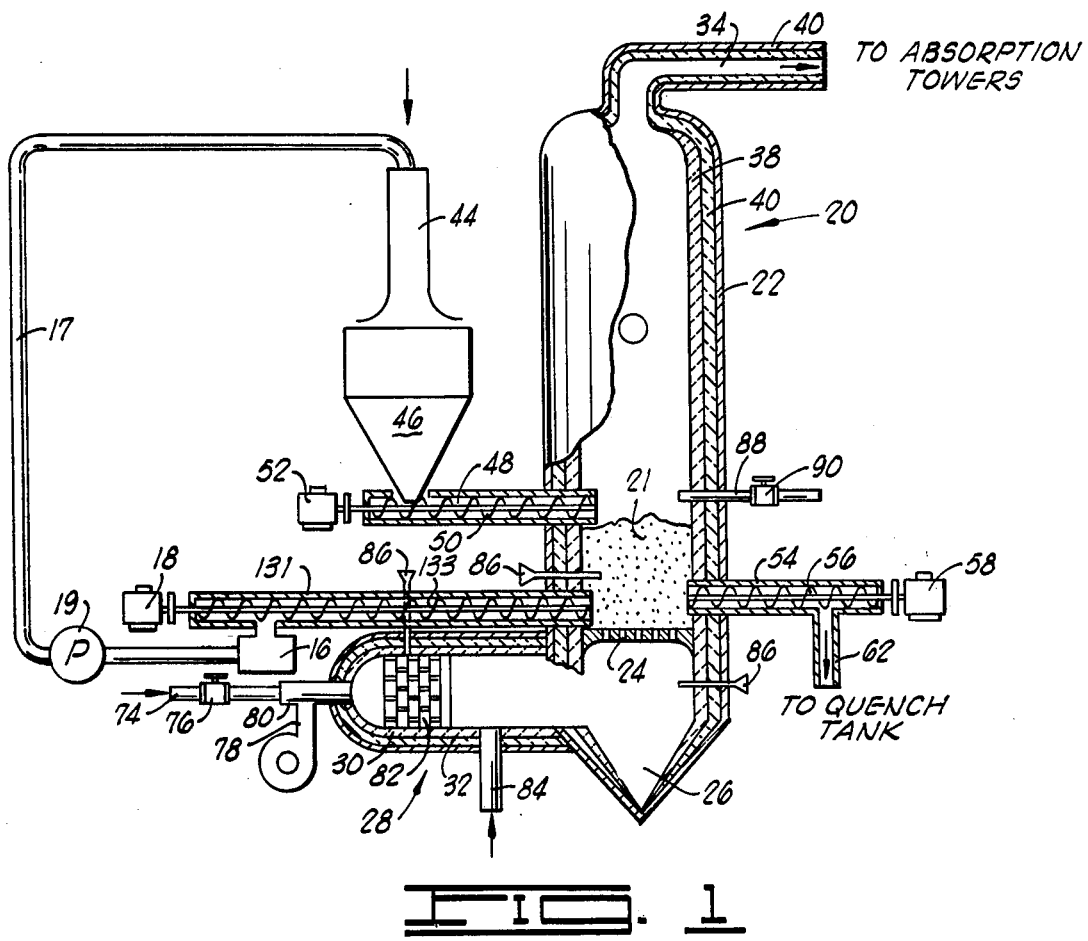
FIG. 1 is a schematic of a fluosolid reactor which is the preferred apparatus for performing my improved process for preparing metallic sulphates.

Referring in detail now to the drawings for illustration of the improved process, wherein like or similar parts of the preferred apparatuses for performing my improved process are identified by like reference numerals, and particularly in FIG. 1, there is seen in general a suitable fluosoild reactor 20 including a cylindrical tank 22 having a refractory lining 38, an insulation 40 and a perforated plate 24 with fluidized bed 21 resting thereon. Plate 24 is situated at the lower end of tank 22 such that the height above plate 24 is not less than approximately five times the diameter of tank 22 in order to provide suitable space for stabilizing all vapors from bed 21 as they exit through tank pipe 34 into the absorption towers, generally illustrated as 36. Insulation 40 also surrounds tank pipe 34. A heating furnace 28 is connected to the lower end of tank 22 and includes a refractory lining 30 and an insulation 32. It should be designed to regulate both the temperatures and the chemical composition of the heating gases which are conducted through conduit 74. A valve 76 is connected with conduit 74 to regulate flow. The gases exit conduit 74 and enter a conduit 80 having a blower 78 connected thereto to provide air and propulsion for the gases as they enter furnace 28 via a burner (not shown in the drawings). A brick checkerwork 82 is disposed within furnace 28 to affect perfect combustion of the burned gases and to act as a reforming compartment in case a small percent of reducing gases is required in the heating gases. Preferably, provisions should be made to reduce the heating gases from a combustion temperature to a heating temperature. If no provisions are provided, a reactor diluting fluid can be admitted through conduit 84. Pyrometers 86 are situated in the tops of conical pit 26, furnace 28 and at the bottom of cylindrical tank 22 to provide temperatures of all respective places.

FIG. 2 illustrates a rotary kiln, generally illustrated as 300, with which some embodiments of my improved process may be utilized. Kiln 300 is positioned on tires 302 and is rotated by motor 304. A refractory lining 30 lines kiln 300 and a gas burner 81, supplied with air from blower 78 and gas from conduit 74, delivers a combustible mixture to reformer 306. Reformer 306 is lined with lining 30 and is a combustion chamber filled with a brick checkerwork (not shown in the drawings) similar to brick checkerwork 82 of FIG. 1. It is maintained at a bright red heat to act as a gas reformer for reforming excess gas into carbon monoxide and hydrogen. Products of combustion exit reformer 306 and enter a chrom-iron alloy channel 308 which is supported by legs 310 and extends for about one-third of the length of kiln 300. Seals 312 prevent the entrance of air into kiln 300. Tumbling rails 314 are placed on the bottom of kiln 300 to prevent accretions from building up on the kiln walls.

Pipe 44 introduces ores into mixing bin 46 where mixing occurs. The mixture of ores are subsequent discharged into conduit feeder 48 which has a feeder screw 50 internally disposed and driven by a motor 52 for feeding the mixture of ores into fluosolid reactor 20 or kiln 300. In FIG. 2 feeder conduit 48 is approximately concentrically positioned with respect to kiln 300. In FIG. 1 feeder conduit 48 should be situated above perforated plate 24 at a height approximately equal to the internal diameter of tank 22. Discharge conduit 54 in FIG. 1 is positioned between feeder conduit 48 and plate 24 of tank 22 and includes discharge screw 56 driven by motor 58 to discharge calcine or sinter products through conduit 62 into quench tank 60. Circulation conduit 131 includes circulation screw 133 driven by motor 18 for depositing circulation material in storage tank 16 from where pump 19 recirculates the material to mixing bin 46 through conduit 17. Conduit 88 extends into tank 22 and is approximately diametrically situated to feeder conduit 48. Conduit 88 has valve 90 connected therein for regulating the flow of raw fuel gas therethrough. Calcine or sinter products discharge kiln 300 in FIG. 2 through conduit 316 into quench tank 60 which has water 64 introduced therein through conduit 66. Valve 68 is connected within conduit 66 and regulates the flow of water 64 which provides a water seal to prevent air from entering kiln 300 or tank 22.

Figure 3:
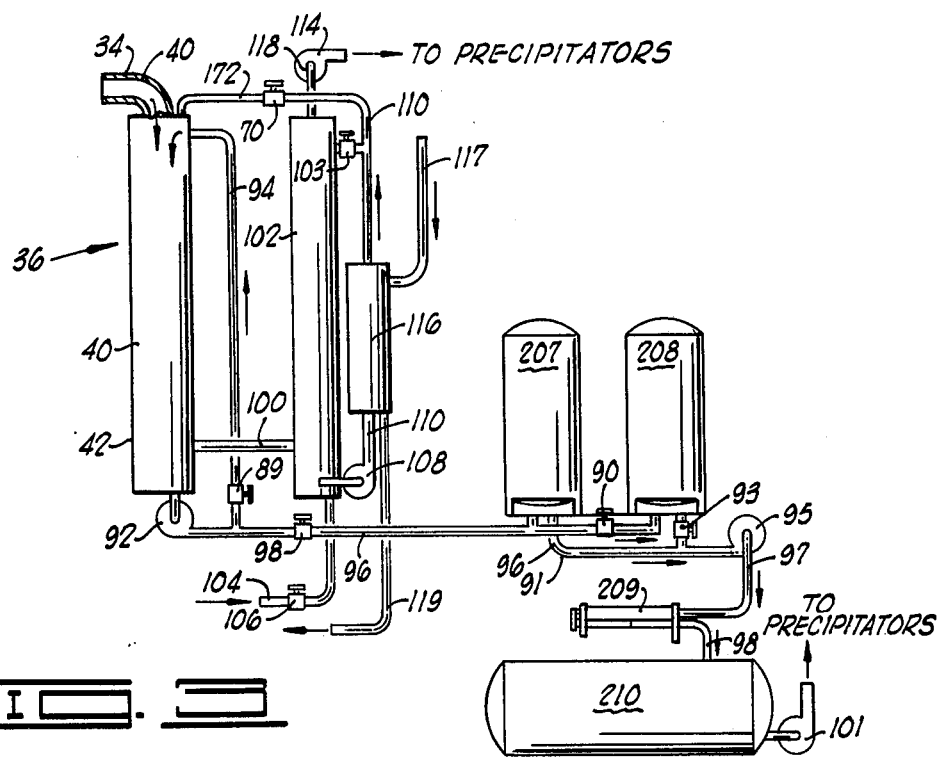
FIG. 3 is a schematic of absorption towers and storage tanks which recover the volatile products of the improved process.

The gaseous products of kiln 300 and tank 22 exit through conduit 318 and tank pipe 34, respectively, into absorption towers of FIG. 3, generally illustrated as 36. Hot tower 42 in FIG. 3 includes insulation 40 and is preferably packed at a temperature between about 80° C. and 100° C. Circulation pump 92 is attached to tower 42 and pumps fluids either through conduit 96 to settling tanks 207 and 208, or for recirculation through conduit 94 into tower 42. Valves 89 and 98 are located within conduits 94 and 96, respectively, for regulating flow. Valve 90 is also located within conduit 96 and regulates flow communication between tanks 207 and 208. Settled fluids leave tanks 207 and 208 through conduit 91 and is pumped by a pump 95 through conduit 97 into a filter 209. Valve 93 is connected within conduit 91 and may regulate flow from tank 208. Filtered fluids exit filter 209 through conduit 99 into a storage tank 210 where they can be pumped to a precipitator (not shown in the drawings) by a pump 101. Vapors not dissolved in tower 42 pass into a cold absorption tower 102 via conduit 100. Cold absorption tower 102 is preferably kept at a temperature between approximately 23° C. and 30° C. Conduit 104 has a valve 106 connected within and conducts the flow from and into the bottom of tower 102. As liquors build up in tower 102, they may be either recirculated into tower 102 by pump 108 through valve 103 and conduit 110 which is surrounded by a heat exchanger 116 having water supplied thereto through conduit 117, or they may be pumped by pump 108 through conduit 110, valve 70, and conduit 172, in order stated, into tower 42. The heat exchanger water exits heat exchanger 116 through conduit 119.

Vapors from cold tower 102 exit through conduit 118 and are discharged by blower 114 into a precipitator (not shown in the drawings).

A concentrated solution of the discharge calcined and water 64 exits quench tank 60 in FIG. 4 through conduit 130 into a bowl classifier 132 where settling of unreacted ores 134 takes place. Ores 134 leave classifier 132 through discharge conduit 136 having a screw 138 internally disposed and driven by a motor 140 for depositing ores 134 upon conveyor belt 142 which is driven by wheel members 144. Ores 134 leave conveyor belt 142 and fall into an open tank 146 where they may be subsequently recycled to mixing bin 46 through conduit 44. Liquids having no unreacted ores 134 in suspension leave classifier 132 through conduit 148 and are pumped, in order stated, by pumps 150 through filter 152, through conduit 154, and into a storage tank 156 where a pump 158 may subsequently pump the liquid into a precipitator (not shown in the drawings).

In operation of the invention, with FIG. 2 being initially referred to, a charge is prepared and introduced into mixing bin 46 via conduit 44. The charge is composed of a mixture of between approximately 25% to 80% weight of a metallic sulphide (e.g. zinc sulphide, copper sulphide, iron sulphide, cadmium sulphide, or etc.) and between about 20% to 75% weight of ammonium sulphate. Preferably, the metallic constituent is zinc, and the preferred mixing proportion is about 60% weight of zinc sulphide and about 40% weight ammonium sulphate. A small quantity of between about 1% to 5% weight brimstone (sulphur) may be initially added to a charged zinc sulphide mixture if there is a deficiency of sulphur in the zinc sulphide ore. The large weight of zinc sulphide ore is preferred because the high excess speeds the reaction by providing a greater surface area of ore with which the ammonium bisulphate is to react. Also, a higher percent of zinc sulphide ore in the charge actually reduces the pasty consistency at certain points within kiln 300. Theoretically, only about 25% weight of zinc sulphide ore is needed to react with about 75% weight of ammonium sulphate. This is equivalent to a mixture of about one mole of metallic or zinc sulphide to approximately two moles of ammonium sulphate.

The metallic or zinc sulphide concentrates may consist of new concentrates or unreacted concentrates 134 returning from open tank 146. The ammonium sulphate may be newly added ammonium sulphate, or it may be recycled ammonium sulphate resulting from the manufacture of zinc sulphide pigments in accordance with Reaction (3) above as was fully described in my U.S. Pat. No. 3,443,888, patented on May 13, 1969.

Prior to charging the mixture of metallic sulphide ores and ammonium sulphate to kiln 300, the gas burner 81 is ignited and adjusted to bring the discharge end of kiln 300 to about 700° C. The operating temperature of the feed end should be held between about 300° C. and 370° C. and a temperature of at least about 470° C. should be attained before charging through feeder conduit 48 begins. All temperatures given in this invention are based upon atmospheric pressure unless otherwise stated. I have found that pressures at or near atmospheric ($\pm$ 1 psia) suitable for processing my invention. However, my invention should not be limited to operating at atmospheric pressure because other suitable pressures could work.

As feeder conduit 48 feeds kiln 300 and heating begins, fusion commences in accordance with Reaction (1) at temperatures as low as 150° C. As soon as the ammonium bisulphate develops, the charge becomes pasty, and the tumbling rails 314 should extend far enough to reach beyond the point of incipient fusion to break up the pasty lumps. However, 1 have discovered that the need for tumbling rails 314 is limited when the heat for reaction is supplied by directly contacting the mixture with heating gases resulting from products of combustion of a heating fuel (e.g. water gas, producer gas, or mixtures thereof, etc.) entering through conduit 74. It is preferred that the amount of air mixed with the heating fuel is properly controlled as to reducing content and be between about 1% and 25% deficient for complete combustion. This is based on my discovery that by utilization of a heating fuel comprising between about 1% volume to about 6% volume of reducing gases selected from the group consisting of hydrogen, carbon monoxide, carbon dioxide, nitrogen, and mixtures thereof, the reaction zone within kiln 300 can be controlled so as to correct the aforementioned undesirable off balances resulting not only from sulphiding of newly formed zinc sulphate of Reaction (5), but also the infiltration of air which caused Reaction (4). Therefore, a theoretical efficiency of approximately 100% can be obtained in the mixing of a metallic sulphide ore (preferably zinc sulphide) with ammonium sulphate. Between 1% volume and 6% volume of reducing gases in the heating fuel may be obtained by utilization of a heating fuel including combustible gaseous mixture having air being supplied thereto at a rate of between about 75% to about 99% of the theoretical rate necessary for complete combustion of the gaseous mixture to form reducing gases therein. Theoretical rates necessary for complete combustion of gases are well known within the art and may be found from any gas graphs such as those published by the AIME. The presence of these certain reducing gases (e.g. $CO_2$, $CO$, $H_2$, etc.) in the reaction zone resulting from incomplete combustion due to insufficiency of air, enables any excess $SO_2$ formed from Reaction (5) to be reduced back to elemental sulphur in accordance with Reactions (6) and (7) below and thereby restore balance to Reaction (2).

$$SO_2 + 2CO \rightarrow S + 2CO_2 \quad (6)$$

$$SO_2 + 2H_2 \rightarrow S + 2H_2O \quad (7)$$

Thus, Reaction (5) is inhibited because evolving $SO_2$ is rapidly removed from over the charge within the reaction zone. The rapid removal of $SO_2$ also increases the rate of reaction of ammonium bisulphate with the metallic sulphide ore and reduces the pasty character of the charge to thereby improve the mechanical operation of kiln 300.

Table I shows various precentages of air deficient for completely burning a natural gas, and the resulting reducing gases entering kiln 300 which yielded approximately 100% efficiency in the sulphation reaction, Reaction (2), of 161 pounds of zinc sulphide and 320 pounds of ammonium sulphate which is equivalent to a ratio of slightly more than 1 mole of the corresponding metallic sulphide to approximately 2 moles of the ammonium sulphate. The natural gas was methane and the air was based on a composition of approximately 75.5% weight nitrogen, about 23.2% weight oxygen, about 1.3% weight argon, about 0.05% weight carbon dioxide, and the remaining 0.05% weight consisting essentially of kryton, xenon, neon, and helium.

TABLE I

| Percent Deficiency of Air for Complete Combustion | Resulting Products from Burner | | | | | |
|---|---|---|---|---|---|---|
| | %$CO_2$ | %$O_2$ | %$H_2$ | %CO | %$H_2O$ | %$N_2$ |
| 14.5% | 8.0 | 0.0 | 3.4 | 3.0 | 17.1 | 68.5 |
| 25.0% | 6.3 | 0.0 | 5.7 | 5.1 | 16.3 | 66.6 |
| 10.0% | 8.4 | 0.0 | 2.4 | 2.2 | 17.4 | 69.6 |

Table I is merely exemplary in illustrating that under certain conditions where a deficiency of air is used in burning a heating fuel selected from the group consisting of water gas, methane, producer gas, and mixtures thereof, a reducing condition develops in the reaction zone including reducing gases that comprise a certain percentage of $CO_2$, $O_2$, $H_2$, CO, $H_2O$, and $N_2$. It has been discovered that the reducing gases should best comprise between about 1% volume to about 6% volume and selected from the group consisting of hydrogen, carbon monoxide, carbon dioxide, nitrogen, and mixtures thereof. When zinc sulphate is used as the metallic sulphate and the reaction zone includes an atmosphere containing between about 1% and 6% reducing gases, evolved sulphur and sulphur dioxide are maintained in a molar ratio of about 1 to 1 and evolved ammonia and zinc sulphate is maintained in a molar ratio of about 1 to 1. This will enable approximately 100% efficiency in the sulphation reaction. It is desirable that the resulting products of combustion be essentially free of oxygen to avoid Reaction (4).

It has also been discovered that by adding a small amount of carbon or carbonaceous material to the charge, a reducing condition in kiln 300 results which is similar to the effect of reducing gases resulting from between about 75% and 99% volume of air in the combustion of the heating fuel. Preferably, carbon black is used. However, the carbonaceous material may be any suitable carbonaceous material and should be between about 0.25% to 3% weight of the weight of the ammonium sulphate, with about 1% being the preferred percentage.

The velocity of the products of combustion of the heating fuel depends on temperatures. I have found that a velocity between about 1 to 60 feet per second with respect to the mixed charge will work. A velocity that is too high can cause excessive dusting. The preferred velocity range sweeps evolved volatile products countercurrently to the flow of the mixture through kiln 300 without creating a turbulent condition in the kiln, and facilitates the heating effect of the products of combustion of the heating fuel. It also speeds the evaporation of elemental sulphur before it reaches its boiling temperature to thereby reduce the pasty condition of the charge.

The heat input, the rate of feed, the rate of revolution of the reaction zone within the kiln, and the excess of ore in the charge must be and can be properly balanced by those in the art so that the charge will be dry before it reaches the annular space between the hot tube and kiln walls situated near the heat input end and extending about one-third the length of the kiln. The required heat input for the zinc reaction is about 3,900 B.T.U. per pound of zinc sulphide. The speed of revolving of the reaction zone and the rate of feed varies with the design of the installation and can be determined by those possessing ordinary skill in the art. When the charge reaches the annular space between the tube 308 and the walls of kiln 300, the temperature is in excess of 440° C. and the charge moves as a dry powder through this annular space. Considerable sulphur, sulphur dioxide and ammonia are still being evolved. The charge leaves kiln 300 through conduit 316 at a temperature between about 640° C. and 690° C. and comprises anhydrous metallic sulphate sinter and unreacted corresponding metallic sulphide ore. In the preferred embodiment, the (sinter) discharged product would therefore be composed of anhydrous zinc sulphate and unreacted zinc sulphide ore.

With continuing reference to the drawings, particularly FIG. 1, for operation of another embodiment of the invention, a charge may be prepared and introduced into tank 22 from mixing bin 46 via conduit 48. The charge for this embodiment of the invention is composed of a mixture of a metallic sulphide (e.g. zinc sulphide, copper sulphide, iron sulphide, cadmium sulphide, or etc.), the corresponding anhydrous metallic sulphate and ammonium sulphate. In a preferred embodiment, the metallic constituent is zinc. The charge mixture may consist of about 23% to 73% weight of ammonium sulphate, about 25% to 75% weight of the corresponding metallic sulphide concentrates, and approximately 2% to 14% weight of the corresponding metallic sulphate. The mixture should consist of a portionate amount of each substance so that the fluidized bed 21 situated on top of perforated plate 24 includes between about 40% and 60% by volume of the anhydrous corresponding metallic sulphate. Also, the bulk density of bed 21 should be between about 50 and 90 pounds per cubic feet and include a particle size ranging between about 10 and about 60 mesh. It has been found that in order to achieve the preferred ranges for density and volume, the preferred embodiment of the invention comprises a mixture of about 42% weight ammonium sulphate, about 50% weight zinc sulphide concentrates, and approximately 8% weight of anhydrous zinc sulphate.

Initially adding to the mixture of zinc sulphide and ammonium sulphate, a quantity of zinc sulphate (preferably anhydrous) is one of the most important features of this embodiment of the invention. This addition will inhibit the development of semi-fluid conditions in the reaction of the zinc sulphide concentrates with the ammonium sulphate. The close contact of the zinc sulphate crystals with ammonium sulphate crystals react to form a double salt as fusion of the ammonium sulphate commences and also, the zinc sulphate begins to dissolve in the melting ammonium sulphate as rapidly as it forms to additionally inhibit fusion of the ammonium sulphate into a semi-fluid.

The metallic or zinc sulphide concentrates of this embodiment may also consist of new concentrates or unreacted concentrates 134 returning from open tank 146. The ammonium sulphate may also be newly added ammonium sulphate, or it may be recycled ammonium sulphate resulting from the manufacture of zinc sulphide pigments in accordance with Reaction (3).

It has also been discovered that a double salt of the corresponding metallic ammonium sulphate may be substituted for the ammonium sulphate in mixing bin 46. Preferably, as aforementioned, the corresponding metallic sulphide is zinc, and the double salt is preferably zinc ammonium sulphate hexahydrate. However, other double salts such as $CdSO_4 \cdot (NH_4)_2SO_4 \cdot 6H_2O$ will also work in my invention. Substitution of zinc ammonium sulphate hexahydrate for ammonium sulphate improves the process and retards the formation of objectionable fluids occurring in the initial fusion step of Reaction (1). I have found that if the double salt of zinc is substituted for the ammonium sulphate, the amount of double salt required will be between about 2 to 3 (more specifically, about 2.22) times that of pure ammonium sulphate. Therefore, both the utilization of the double salt and the recycling of anhydrous zinc sulphate sinter improves the process of manufacturing zinc sulphate in all types of sulphate furnaces.

The mixture enters cylindrical tank 22 through conduit bed feeder 48 and discharges through discharge conduit 54. Conduit 54 is positioned lower than feeder conduit 48 because at a temperature of 350° C. and above, a small percent of the free ammonium generated flashes off as the charge drops into the fluidized bed 21. The rate of feed which the mixed charge progress through conduit 48 depends on the size of cylindrical tank 22, the nature of the corresponding metallic sulphide concentrates, and the temperature. It has been found in a majority of cases that a good general rule in the preferred embodiment is to feed cylindrical tank 22 at a rate of approximately between about 80 to 120 pounds per hour per every 400 pounds of fluidized bed 21 with the preferred rate being approximately 100 pounds per hour per every 400 pounds of fluidized bed 21 positioned on top of perforated plate 24. If the feed rate through conduit 48 becomes too fast or a sudden drop in temperature occurs in furnace 28, large lumps of unreacted mixes will appear on the surface of the fluidized bed. When this occurs, normal feeding to conduit 48 should be terminated, and the normal discharge through discharge conduit 54 should be recirculated to mixing bin 46 until the lumps break up.

The mixed charge lodges on perforated plate 24 and heating within the furnace 28 is maintained at a temperature high enough to maintain the temperature above plate 24 between about 150° C. and 480° C., with the preferred range between about 300° C. and 450° C. Fluidization of the mixed charge does not depend on the temperature of the gases but depends on the volume of gases which contact the charge. Heating is preferably accomplished as it was in kiln 300 which was by directly heating the mixture with products of combustion of a gas introduced into furnace 28 via conduit 80. The gas is preferably a heating fuel selected from the group consisting of water gas, producer gas, natural gas, and mixtures thereof, burning a neutral flame, or any fuel gas which is void of suspended solid particles that would contaminate the zinc sulphide concentrates or plug the orifices of perforated plate 24. It is preferably necessary in some cases as it was in kiln 300, to use a slight deficiency of air blown by blower 78 within the heating gas to have a reducing atmosphere within tank 22 and furnace 28 to correct for any air which has infiltrated into furance 28. It is desirable, as it was for kiln 300, that the heating fuel have between about 1% volume and 6% volume of reducing gases selected from the group consisting of hydrogen, carbon monoxide, carbon dioxide, nitrogen, and mixtures thereof.

In this embodiment of my improved process, I have discovered that since the vapors above the fluidized bed in tank 22 have a lower temperature than the fluidized bed itself the addition of reducing gases may be added to the vapors and do not have to result from burning insufficient air for combustion within the burner. If injection into the vapors is desirable, it is best accomplished by injecting a raw fuel gas through conduit 88 having valve 90 situated within to regulate flow. The injection should be at a rate of between about 1% and 10% of the rate of gas (products of combustion) being added to furnace 28 by blower 78. The fuel gas may be selected from the group consisting of water gas, producer gas, and mixtures thereof. The addition of a raw fuel gas into the vapors directly promotes the reduction of excess sulphur dioxide back to elemental sulphur as was accomplished by burning the heating fuel with insufficient air and illustrated in Reaction (6).

As was previously mentioned, by use of reducing gases within the atmosphere of the reaction zone of kiln 300 or reactor 20 can correct any off balance caused by the liquid sulphur of Reaction (5) and thereby a theoretical efficiency of approximately 100% can be obtained. I have also discovered another way to correct the undesirable side Reaction (5) in the embodiment of my improved process for FIG. 1 If a corresponding metallic oxide, preferably zinc oxide, is initially introduced into the charge mixture of metallic sulphide ores, metallic sulphate and ammonium sulphate, the corresponding metallic or zinc sulphate, ammonia and water are produced in accordance with the following reaction:

$$ZnO + (NH_4)_2 SO_4 \rightarrow ZnSO_4 + 2NH_3 + H_2O \qquad (8)$$

The resulting zinc sulphate is now available to act as if the corresponding metallic or zinc sulphate was initially added to the charge mixture of metallic sulphide ores and ammonium sulphate. The zinc oxide may be added to the zinc sulphide concentrates with no zinc sulphate present initially, or it may be added after or along with the zinc sulphate. The proportionate mixing ranges of the metallic oxide with the corresponding metallic sulphide ore and ammonium sulphate mixture may be between about 1% and 16% weight metallic oxide, between about 15% and 65% weight of the corresponding metallic sulphide ores, and between about 30% and 84% weight of ammonium sulphate. In a preferred embodiment, I have found that when zinc oxides are used along with zinc sulphide the amount required for correcting a zinc sulphate deficiency is about 65 pounds for every 100 pounds of zinc sulphate shortage.

It has also been discovered that a metallic hydroxide, such as $Zn(OH)_2$, or any other oxidized metallic compounds commonly referred to as metallic calcines, may be utilized instead of the metallic oxide. If zinc hydroxide is initially mixed with the charged mixture of zinc sulphide ores and ammonium sulphate, zinc sulphate, ammonia, and water are produced in accordance with the following equation:

$$Zn(OH)_2 + (NH_4)_2 SO_4 \rightarrow ZnSO_4 + 2NH_3 + H_2O \qquad (9)$$

The produced zinc sulphate in this reaction is now also available as it was in Reaction (8) to act in a similar fashion to initially adding the corresponding metallic or zinc sulphate to the charge mixture of metallic or zinc sulphide ores and ammonium sulphate. I have found a proportionate mixing range of the metallic hydroxide with the corresponding metallic sulphide ore and ammonium sulphate mixture to be between about 2% and 16% weight of zinc sulphide calcines or any metallic hydroxide, between about 12% and 36% weight of the zinc or the corresponding metallic sulphide and between about 30% and 86% weight of ammonium sulphate. The preferred embodiment is to use zinc sulphide calcine instead of zinc oxide or zinc hydroxide because it is readily available and costs less. I have also found, as was the case for zinc oxide, that when zinc hydroxides or zinc sulphide calcines are used along with zinc sulphide the amount required for correcting a zinc sulphate deficiency is about 65 pounds for every 100 pounds of zinc sulphate shortage; or for each about 1% weight shortage of zinc sulphate, remove about 1% weight of zinc sulphide in the charge and replace it with an equal weight of zinc sulphide calcines.

It is essential in the preferred embodiment of the improved process that the charge within mixing bin 46 does not consist of merely a mixture of ammonium sulphate and zinc sulphide calcines, because the addition of the ammonium sulphate to only zinc sulphide calcines acts like charging a mixture of only zinc sulphide concentrates and includes the characteristic fusion and corrosion difficulty which are associated with the aforementioned prior arts. If it is desirable to use no zinc sulphide concentrates, but only zinc sulphide calcines and ammonium sulphate in mixing bin 46, then the conventional fusion and corrosion problem can be corrected by recirculating through discharge conduit 131 part of the zinc sulphate and zinc sulphide calcine product. It has been discovered that the amount of zinc sulphate required to prevent fusion and corrosion in the process of mixing ammonium sulphate with a zinc sulphide calcine, such as zinc oxide and/or zinc hydroxide, is only approximately between about 40% to 60% weight of that required to be added to the mixture of ammonium sulphate and zinc sulphide ores to prevent fusion and corrosion. It has also been discovered that the reaction temperatures for sulphating the zinc sulphide calcines are about 100° C. lower than those required for sulphating zinc sulphides. The mixing of the quantity of zinc sulphide calcines is preferably done by adding the zinc sulphide ores to the zinc sulphide calcines prior to mixing with ammonium sulphate and/or the double salt of zinc ammonium sulphate. This essentiality should not be narrowly construed for only zinc sulphide calcines because it may be essential to the process that the charge mixture does not merely consist of a mixture of ammonium sulphate and any metallic calcine. A minor proportion of the produced metallic sulphate may be recycled for mixing with the corresponding metallic calcines and the ammonium sulphate.

Another desirable way to correct the destructive side reactions, such as oxidation of elemental sulphur and sulphiding of newly formed metallic sulphate, is diluting the products of combustion of the heating fuel with a diluent gas. Dilution of products of combustion is best accomplished through conduit 84 and the diluting gas may be selected from steam, nitrogen or recirculated gases (ammonia and carbon dioxide) from the absorption towers 36. In a preferred embodiment, steam is the diluting gas and enters furnace 28 through conduit 84. An advantage of dilution of combustion gases is that the partial pressure of elemental sulphur is reduced and sulphur evaporates at a lower temperature to partially eliminate pasty and semi-fluid conditions. Another advantage to diluting of combustion gases is that not only will the partial pressure of sulphur be reduced, but partial pressures of all volatile products will be reduced and their evaporation rates increased which augments the capacity of tank 22 and the process is improved. Steam dilution will also assist in reclaiming volatile products in towers 36. The diluting rate may be anywhere from about 8.0 to 12.0 parts of steam to 1 part of heating fuel entering furnace 28 through conduit 74 with the preferred embodiment calling for about 10.0 parts of steam by volume to 1 part of heating fuel entering furnace 28 through conduit 74 by volume. With no steam dilution, zinc sulphate in Reaction (5) may be between 85% to 90% sulphidized at a temperature of about 300° C. in about 1.5 hours by liquid sulphur, or concentrated vapors of sulphur. But with a contact time of only a few minutes and a sulphur dilution of about 10.0 to 1, sulphidization of zinc sulphate in accordance with Reaction (5) is essentially insignificant at temperatures as high as even 400° C. or above. It has been discovered that at a temperature of around 200° C. and in one hour sulphur vapors that have been diluted at about 100 to 1 will only about 1% sulphidize zinc sulphate. Diluting with steam is better than other methods of controlling the temperatures of the products of combustion below plate 24 because steam cooling retains most of the avialable heat units within the combustion gases. In some cases I have found that it might be worthwhile to insert heat exchange cooling tubes (not shown in the drawings) within furnace 28 to heat water or generate steam. Example I hereinafter presented gives the volume and percentages of gases and diluting steam required for reacting 1,000 pounds of commercial ammonium sulphate, and 368 pounds of zinc sulphide concentrates, along with 184 pounds of dry zinc sulphate and 184 pounds of dry zinc sulphides circulated from discharge conduit 131, and along with 610 pounds of insoluble zinc sulphides 134 recirculated from open tank 146.

Perhaps the best preventative of all for controlling many of the undesirable destructive side reactions is careful temperature control between temperatures of about 300° C. and 350° C. of the reaction zone within tank 22 and kiln 300. A laboratory study of the reaction rates of zinc sulphide and ammonium sulphate show that the reaction is very slow below a temperature of about 250° C., averaging about 10% for the first 80 minutes. At a temperature of about 350° C., 80% of the reaction is completed in 80 minutes and when the temperature is above 450° C., 95% of the reaction is completed in less than 20 minutes. By keeping within temperatures of between about 300° C. and 350° C., many of the side reactions will not be objectionable. The volume of the products of combustion of the heating gases that provide heat for fluidizing the charge within tank 22 must be carefully formulated to be substantially free of volatile products, except the normal proportions of $H_2O$, $CO_2$, and $N_2$, and also free, as previously mentioned, of all suspended solid particles. The dilution gases should also be free of suspended solids.

Volatile products exiting tank 22 or kiln 300 comprise carbon dioxide, sulphur, sulphur dioxide, ammonia, water and nitrogen. These gases are swept out of fluo-solid reactor 20 countercurrent to the depositing of the mixtures from feeder conduit 48 into tank 22 and initially enter an absorption zone within absorption tower 42 which is maintained at a temperature of between about 80° C. and 98° C. and includes water. Within tower 42 all of the sulphur and sulphur dioxide are absorbed by the water along with approximately one-half of the ammonia products to form ammonium sulphite and ammonium thiosulphate. The sulphur from the reaction should be sufficient enough to subsequently convert all of the ammonium sulphite to ammonium thiosulphates. However, in a preferred embodiment, it is advisable to add between about 1.0% and 5.0% weight of brimstone (sulphur) to hot tower 24 in order to maintain a large excess of elemental sulphur to assure complete conversion of all ammonium sulphites to ammonium thiosulphates. The brimstone may be added at any convenient location (none shown in the drawings) within tower 42, but it is preferable to add the brimstone in the top of tower 42. A sample from tower 42 should be taken frequently to determine if sulphur has to be added. When the solution of ammonium thiosulphate in tower 42 reaches a suitable concentration, preferably in the range of 750 to 850 grams per liter, pump 92 pumps the thiosulphate through conduit 96 into settling tanks 207 and 208. If the concentration of ammonium thiosulphate is not high enough, as when the process initially starts, the thiosulphate may be pumped by pump 92 through conduit 94 to be recirculated back into tower 42. Concentrations lower than 700 grams per liter can be used but results in more water in the filtrate which would require additional heat to evaporate. From tanks 207 and 208 the ammonium thiosulphate is sent by pump 95 through filter 209 via conduit 97 from which it enters storage tank 210 from conduit 99. From storage tank 210 the ammonium thiosulphate may subsequently be sent to a precipitator (not shown in the drawings) for utilization in the continuous precipitation method of manufacturing zinc sulphide pigments as was disclosed in my U.S. Pat. No. 3,443,888 and No. 3,672,830.

Vaporous products such as the other half of the ammonia and carbon dioxide which were not dissolved in tower 42 exit tower 42 through conduit 100 into a cold absorption tower 102 which is maintained between about 23° C. and 30° C. Tower 102 provides cooling facilities where ammonia and carbon dioxide are dissolved in water entering tower 102 through conduit 104 to form ammonium bicarbonate ($NH_4HCO_3$), and vaporous ammonia which leaves cold tower 102 via conduit 108 and may be blown by blower 114 to the previously mentioned precipitator for manufacture of zinc sulphide pigments as disclosed in my aforementioned patents. When the concentration of ammonium bicarbonate has reached a suitable range readily determined by those skilled in the art, it may leave cold tower 102 through conduit 104 to be combined with the purified zinc sulphate to make a slightly basic carbonate and ammonium sulphate. Preferably, the purified zinc sulphate solution (160 g/liter zinc) should be diluted with water to reduce the concentration to less than 16 g/liter of zinc in order to recover a substantial percentage of the zinc as carbonate. The zinc carbonate should be separated from solution by filtering. After filtering the zinc carbonate should be washed, dried and subsequently calcined at a temperature between about 420° C. and 480° C., and preferably at 450° C., to produce zinc oxide. The filtrate of ammonium sulphate and zinc sulphate may subsequently be evaporated to recover an anhydrous zinc ammonium sulphate double salt and returned to the initial sulphation step. Therefore, by utilization of my improved process, I have come up with a unique method of manufacturing zinc oxide. This unique method should not be narrowly construed to only include zinc oxides because any metallic oxide may be manufactured by this technique.

If the concentration of ammonium bicarbonate in cold tower 102 has not reached the desired concentration, such as when the process is initially started, then the ammonium bicarbonate may be recirculated by pump 108 through conduit and valve 103 back into tower 102, or the bicarbonate solution may be circulated back into hot tower 42 through valve 70 and conduit 172 when valve 103 is secured.

Metallic sulphate sinter and particles of unreacted corresponding metallic sulphide concentrates either exit tank 22 or kiln 300 and enter quench tank 60 through conduit 62. Preferably, the metallic constituent in zinc. Water 64 develops a concentrated solution of metallic sulphate including unreacted corresponding metallic sulphide in suspension. In a preferred embodiment, the concentration of zinc sulphate within quench tank 60 is between about 160 to 200 grams of zinc ions per liter before it exits through conduit 130 into bowl classifier where unreacted concentrates of metallic or zinc sulphide 134 settle out and are deposited in open tank 146 by means of conduit 136 with screw 138 internally disposed and turned by motor 140 and conveyor belt 142 turned by wheel members 144. From tank 146 the metallic or zinc sulphide may be recycled back to mixing bin 46 for production of more metallic sulphate. Metallic or zinc sulphate exits bowl classifier 132 through conduit 148 as a muddy liquor and is pumped by pump 150 through filter 152 and into storage tank 156 via conduit 154; the metallic or zinc sulphate may subsequently leave tank 156 by pump 158 for utilization in the previously mentioned precipitator for manufacture of metallic sulphide pigments, which in the preferred embodiment is zinc sulphide pigments as was disclosed in previously mentioned patents.

My invention will be illustrated by the following set forth examples which are given by way of illustration and not by any limitations. All parameters such as concentrations, mixing proportions, temperatures, pressures, rates, compounds, etc., submitted in these examples are not to be construed to unduly limit the scope of my improved process for manufacturing metallic sulphates.

EXAMPLE I

This example was based on a total charged mixture for fluosolid reactor 20 including about 42% ammonium sulphate, about 8% zinc sulphate and about 50% zinc sulphide. These percentages were based on 1,000 pounds of ammonium sulphate, 368 pounds of newly added zinc sulphide concentrates, 368 pounds of combined zinc sulphate and zinc sulphide (equivalent to about 37% of the weight of ammonium sulphate) circulated from circulating conduit 131, and 610 pounds of insoluble zinc sulphide concentrates 134 recirculated from open tank 146.

I regulated the amounts of feed mixture, circulation and recirculation concentrates by choosing the percent of sulphides and sulphates to remain in the reactor 20. For this example, I desired equal parts of sulphate and sulphide. I subsequently calculated stoichiometrically the amounts of ammonium sulphate and (metallic) zinc sulphide to be fed and the sulphate that would be manufactured by a complete reaction, which in this example was 1000 pounds, 368 pounds and 610 pounds, respectively. These proportions were to remain constant. The recirculation of unreacted metallic sulphide 134 was obtained by adding the necessary amount (which was 610 pounds) of sulphide concentrates to mixing bin 46. The circulation of zinc (or metallic) sulphate was needed to prevent semi-fusion in feeder conduit 48 and on top of plate 24 in fluosolid reactor 20. For this example, I circulated 184 pounds of zinc sulphate from fluidized bed 21 through circulation conduit 131. One hundred eighty-four pounds of unreacted zinc sulphide concentrates were also included in circulating the 184 pounds of zinc sulphate. The circulations and recirculations were continuously done and sometimes had to be slightly altered as chemical analysis of the dry mixture of zinc sulphate and zinc sulphide discharging through discharge conduit 54 showed a departure from the chosen ratio of zinc sulphate to zinc sulphide in reactor 20. The amount of both zinc sulphate and zinc sulphide circulating from circulating conduit 131 can be increased as required, increasing fluidized bed 21 in reactor 20 without altering production of sulphates and sulphides. For each 610 pounds of sulphate and sulphide produced in this example, yielded about 758 pounds of volatile gases having ammonia, sulphur, sulphur dioxide and water vapor.

The following Table II discloses the various volumes, densities, and volume percentages of all evolved gases, products of combustion from a natural gas, and diluting steam resulting from each production of 610 pounds of zinc sulphate. For each 610 pounds of zinc sulphate produced 1,440,000 B.T.U.'s or 1,700 ft³ of a natural gas having an 85% thermal efficiency was required in the furnace 28 of the fluosolid reactor 20. As previously mentioned, this invention should not be limited to heating gases prepared from natural gas. Any method of preparing heating gases that are strictly neutral and free of suspended solid particles could produce the same results.

TABLE II

| Gas | Density lbs/ft³ | Volume ft³ for each 1,000 lbs of NH4SO4 | % Volume for all Gases and Diluting Steam |
|---|---|---|---|
| Ammonia 4 NH3 | 0.0481 | 5,536 | 18.38 |
| Sulphur dioxide SO2 | 0.1827 | 1,325 | 4.5 |
| Sulphur elements S | 0.5 | 242 | |
| Water 2H2O | 0.373 | 2,650 | 8.5 |
| | | 9,753 | 31.38 |
| Carbon dioxide CO2 | .1034 | 1,700 | 5.5 |
| Water 2 H2O | .0373 | 3,400 | 10.95 |
| Nitrogen 9.52 N2 | | 12,800 | 41.2 |
| | | 17,900 | 57.70 |
| Dilution H2O 2 X Fuel Gas Volume | | 3,400 | 10.95 |
| | | 3,400 | 10.95 |
| | | 31,050 | 100.00 |

From the above Table II it is seen that the volume of the gases generated by the reactions have about one-half the volume of heating gases before dilution with steam. The volume of steam was estimated from data taken on a small laboratory furnace and was much smaller than that required on a commercial size furnace which would take diluting steam at a volume at least equal to the total volume of gases. The volume of steam dilution commercially would therefore be 9,753 ft³ +17,900 ft³, or 27,653 ft³. The total volume commercially of the steam and the gases would therefore be about 55,300 ft³. The vapor pressure of the elemental sulphur in the volatile products prior to steam dilution was about 242 ft³ × 760 mm. ÷ 9,753 which equals 18.85 mm. of Hg. After diluting with steam and contacting with products of combustion the vapor pressure decreased to about 242 × 760 mm. ÷ 31,050 which equals 5.92 mm. of Hg.

If the products of this sulphation example are to be used in the continuous precipitation method of my U.S. Pat. No. 3,443,888, the weight of the anhydrous zinc sulphate, elemental sulphur, sulphur dioxide and ammonium carbonates of the reaction

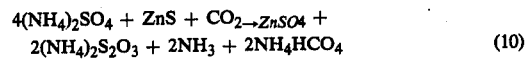

$$4(NH_4)_2SO_4 + ZnS + CO_2 \rightarrow ZnSO_4 + 2(NH_4)_2S_2O_3 + 2NH_3 + 2NH_4HCO_4 \tag{10}$$

must be equivalent chemically. A departure from the theoretical amounts is expressed as an "off balance." Any "off balance" may be corrected by adding or subtracting ammonium and zinc compounds from the system. Minor "off balance" may be corrected by merely manipulating the chemical character of the heating gases in the fluosolid reactor 20. For example, small amounts of air are always being introduced with the heating fuel or when the gas burner malfunctions. Adjustment of the burner to slightly reducing will not only neutralize any air being admitted, but will reduce some of the sulphur dioxide back to elemental sulphur in accordance with Reactions (6) and (7) to thereby correct any "off balance."

EXAMPLE II

A kiln 300 was equipped with a natural gas heating unit having a reformer. An excess of zinc sulphide concentrates was used and all ammonium sulphate was consumed. The discharged sinter was assayed for zinc as zinc sulphate. Unreacted zinc sulphide was determined from the law of conservation of matter. All volatile products were collected in absorption towers and the liquors were analyzed for free and fixed ammonia. Ammonia percent recovery was determined by dividing the total ammonia collected times 100 by the ammonia charged. Percent recovery of zinc was calculated from zinc in sinter times 100 ÷ zinc in charge. The percent chemical balance was defined as total weights of ammonia times 100 ÷ total weights of zinc. The kiln 300 was charged with 39.16 kg. at equal parts of ammonium sulphate and zinc sulphide concentrates at a feed rate of about 9.79 kg./hour. The zinc content was 11.43 kg. (29.6%) and the ammonia content was 4.44 kg. (12.9%). The feed end of the kiln had a temperature of about 200° C. and the discharge end including reducing gases had a temperature of about 760° C. The zinc as zinc sulphate sinter product was 11.56 kg. and the ammonia collected in the towers was 5.05 kg. This gave a zinc recovery of about 101% and an ammonia recovery of about 97%. The percent chemical balance was about 102%. The percent ratio of free ammonia to fixed ammonia was about 103% which indicates there was a slight excess of reducing gases in the burner; a ratio of 1.00 indicates perfect combustion.

EXAMPLE III

A laboratory rotary kiln (5" × 18") was similarly charged as in Example II with 1.70 kg. at equal parts of zinc sulphide concentrates and ammonium sulphate at a feed rate of about 0.425 kg. per hour. The zinc content was 0.516 kg. (30.3%) and the ammonia content was 0.216 kg. (12.7%). The feed end of the laboratory rotary kiln had a temperature of about 250° C. and the discharge end including reducing gases was 470° C. The zinc product was 516.4 g and the ammonia in the towers was 187 g. Percent recovery of zinc and ammonia was 100.5% and 86.5%, respectively. The percent chemical balance was 93%, and the percent ratio of free ammonia to fixed ammonia was about 125% which indicated that there were much too many reducing gases present.

EXAMPLE IV

A 3-inch fluosolid reactor was similarly charged as in Example II with 1.55 kg. at a feed rate of 0.258 kg. per hour. The composition of the feed was 16.2% zinc (0.251 kg. and included sulphate sinter from a previous run to prevent pastyness) and 8.9% ammonia (0.131 kg). The temperatures below and above plate 24 were 490° C. and 480° C., respectively. Two hundred forty-seven g of zinc (as zinc sulphate) and 126.7 g of ammonia were produced. Zinc recovery was therefore 98.4% which is higher than any prior art method. Ammonia recovery was 97.0%. The chemical balance was 99.5% which indicates that there was a little too much air in the heat gases. The percent ratio of free ammonia to fixed ammonia was 68%.

While the present invention has been described herein with reference to particular embodiments thereof, and specific examples a latitude of modification, various changes and substitutions are intended in the foregoing disclosure, and in some instances some features of the invention will be employed without a corresponding use of other features without departing from the scope of the invention as set forth.

I claim:

1. In a process for producing metallic sulfates of metals selected from the group consisting of zinc, copper, iron and cadmium, which process comprises forming a mixture of the corresponding metallic sulfide concentrates and ammonium sulfate, heating said mixture in a non-oxidizing atmosphere of temperatures of between about 150° C. to 480° C. to convert said mixture into said metallic sulfate, ammonia, sulfur and sulfur dioxide, removing said metallic sulfate from the heating zone and quenching said metallic sulfate in water, passing the volatile products of the reaction consisting essentially of ammonia, sulfur vapor, sulfur dioxide and water into a first absorption zone at temperatures of between about 100° C. and 150° C. to form ammonium thiosulfate, passing the residual gases from said first zone into a second zone where the residual ammonia is absorbed in water, the improvement comprising, converting at least about 95% wt. of said sulfide to said sulfate by (a) adding to said mixture of ammonium sulfate and metallic sulfide, a quantity of the corresponding metallic sulfate to inhibit the development of agglomerating conditions in the reaction of said metallic sulfide concentrates with said ammonium sulfate and to form a resulting feed mixture consisting of about 25–75% wt. of said metallic sulfide, 23–73% wt. of said ammonium sulfate, and 2–14% wt. of said metallic sulfate;

(b) introducing said resulting feed mixture into the upper portion of a fluidized bed reactor;

(c) directly heating said resulting feed mixture to a temperature of about 150–480° C. with the products of combustion of a heating fuel selected from the group consisting of water gas, producer gas, natural gas, and mixtures thereof, said products of combustion comprising between about 1.0% by volume to about 6.0% by volume of reducing gases selected from the group consisting of hydrogen, carbon monoxide, and mixtures thereof, to convert said resultant feed mixture to metallic sulfate, ammonia, sulfur, sulfur dioxide and water, while maintaining evolved sulfur and sulfur dioxide in a molar ratio of about 1 to 1 and to maintain evolved ammonia and produced metallic sulfate in a molar ration of about 1 to 1;

(d) removing the metallic sulfate from the lower portion of said reactor and passing said removed metallic sulfate to a quench zone where the sulfate is dissolved in water to form a metallic sulfate solution;

(e) sweeping carbon dioxide, evolved sulfur, sulfur dioxide, and ammonia out of the upper portion of said reactor;

(f) passing the swept out gases into a first absorption zone where the sulfur dioxide and a portion of the ammonia are dissolved and reacted to form an ammonium thiosulfate solution; and (g) passing the remaining gases from the first absorption zone to a second absorption zone where the remaining ammonia and the carbon dioxide are scrubbed with water and react to form an ammonium carbonate solution.

2. The process of claim 1 wherein said metallic sulphate is zinc sulphate and said resulting feed mixture includes a bulk density in the fluidized bed between about 50 and 90 pounds per cubic foot and particulate matter size ranging between about 10 mesh to 60 mesh.

3. The process of claim 2 wherein said mixture of ammonium sulphate, zinc sulphide concentrates and zinc sulphate comprises about 42% weight ammonium sulphate, about 50% weight zinc sulphide concentrates and about 8% weight zinc sulphate.

4. The process of claim 1 wherein said quantity of said resulting feed mixture is continuously added at a rate of between about 80 and 120 pounds per hour for every about 400 pounds of reaction mixture in said reactor 5. The process of claim 4 wherein said quantity of said resulting feed mixture is added at a rate of about 100 pounds per hour for every about 400 pounds of the reactor mixture in said reactor.

6. The process of claim 1 additionally including diluting said products of combustion with a quantity of a diluting neutral gas to adjust the temperature of said products of combustion.

7. The process of claim 6 wherein said diluting fluid is selected from the group consisting of steam, nitrogen, ammonia and carbon dioxide.

8. The process of claim 1 wherein said first absorption zone is maintained between a temperature of about 80° C. and 98° C.

9. The process of claim 1 wherein said metallic sulphate is zinc sulphate and said produced ammonium thiosulphate comprises a concentration range of between about 750 to 850 grams per liter.

10. The process of claim 1 wherein said second absorption zone is maintained between a temperature of about 23° C. and 30° C.

11. The process of claim 1 wherein said quenched metallic sulphate includes unreacted corresponding metallic sulphide concentrates.

12. The process of claim 11 additionally including separating off said unreacted corresponding metallic sulphide concentrates and said mixture of quenched metallic sulphate and unreacted corresponding metallic sulphide concentrates and recycling said separated corresponding metallic sulphide concentrates to said upper portion of said fluidized bed reactor for further production of said metallic sulphate.

13. The process of claim 12 additionally including removing said metallic sulphate and purifying said removed metallic sulphate by filtering.

14. An process of claim 12 wherein said metallic sulphate is zinc sulphate solution and said zinc sulphate within said quench zone includes a concentration of between about 160 to 200 grams of zinc ions per liter.

15. The process of claim 1 wherein a quantity of said produced metallic sulphate is recycled directly from said reactor for admixing with said mixture of said corresponding metallic sulphide concentrates and said ammonium sulphate for further production of said metallic sulphate.

16. The process of claim 15 wherein said quantity of said produced metallic sulphate includes unreacted corresponding metallic sulphide concentrates.

17. In a process for producing metallic sulfates of metals selected from the group consisting of zinc, copper, iron and cadmium, which process comprises forming a mixture of the corresponding metallic sulfide concentrates and ammonium sulfate, heating said mixture in a non-oxidizing atmosphere of temperatures of between about 150° to 480° C. to convert said mixture into said metallic sulfate, ammonia, sulfur and sulfur dioxide, removing said metallic sulfate from the heating zone and quenching said metallic sulfate in water, passing the volatile products of the reaction consisting essentially of ammonia sulfur vapor, sulfur dioxide and water into a first absorption zone at temperatures of between about 100° C. and 150° C. to form ammonium thiosulfate, passing the residual gases from said first zone into a second zone where the residual ammonia is absorbed in water, the improvement comprising, converting at least about 95% wt. of said sulfide to said sulfate by (a) adding to said mixture of ammonium sulfate and metallic sulfide, a quantity of the corresponding metallic sulfate to inhibit the development of agglomerating conditions in the reaction of said metallic sulfide concentrates with said ammonium sulfate and to form a resulting feed mixture consisting of about 25–75% wt. of said metallic sulfide, 23–73% wt. of said ammonium sulfate, and 2–14% wt. of said metallic sulfate;

(b) introducing said resulting feed mixture into the upper portion of a fluidized bed reactor;

(c) directly heating said resulting feed mixture to a temperature of about 150° C. to 480° C. with the products of combustion of a heating fuel selected from the group consisting of water gas, producer gas, natural gas and mixtures thereof, said products of combustion being neutral, adding at a rate of between about 1.0% and 10.0% of the rate of which said products of combustion contact said mixture a quantity of a fuel gas, said fuel gas being added to said evolved sulfur, said sulfur dioxide, said ammonia and water, to convert said resultant feed mixture to metallic sulfate, ammonia, sulfur, sulfur dioxide and water, while maintaining evolved sulfur and sulfur dioxide in a molar ratio of about 1 to 1 and to maintain evolved ammonia and produced metallic sulfate in a molar ratio of about 1 to 1;

(d) removing the metallic sulfate from the lower portion of said reactor and passing said removed metallic sulfate to a quench zone where the sulfate is dissolved in water to form a metallic sulfate solution;

(e) sweeping carbon dioxide, evolved sulfur, sulfur dioxide and ammonia out of the upper portion of said reactor;

(f) passing the swept out gases into a first absorption zone where the sulfur dioxide and a portion of the ammonia are dissolved and reacted to form an ammonium thiosulfate solution; and (g) passing the remaining gases from the first absorption zone to a second absorption zone where the remaining ammonia and the carbon dioxide are scrubbed with water and react to form an ammonium carbonate solution.

18. In a process for producing metallic sulfates of metals selected from the group consisting of zinc, copper, iron and cadmium, which process comprises forming a mixture of the corresponding metallic sulfide concentrates and ammonium sulfate, heating said mixture in a non-oxidizing atmosphere of temperatures of between about 150° C. to 480° C. to convert said mixture into said metallic sulfate, ammonia, sulfur and sulfur dioxide removing said metallic sulfate from the heating zone and quenching said metallic sulfate in water, passing the volatile products of the reaction consisting essentially of ammonia sulfur vapor, sulfur dioxide and water into a first absorption zone at temperatures of between about 100° C. and 150° C. to form ammonium thiosulfate, passing the residual gases from said irst zone into a second zone where the residual ammonia is absorbed in water, the improvement comprising, converting at least about 95% wt. of said sulfide to said sulfate by (a) adding to said mixture of ammonium sulfate and metallic sulfide, a quantity of the corresponding metallic calcine which initially reacts to form the corresponding metallic sulfate to inhibit the development of agglomerating conditions in the reaction of said metallic sulfide concentrates with said ammonium sulfate and to form a resulting feed mixture consisting of about 1–16% wt. of said metallic calcine, 30–84% wt. of said ammonium sulfate, and 15–65% wt. of said metallic sulfide;

(b) introducing said resulting feed mixture into the upper portion of a fluidized bed reactor;

(c) directly heating said resulting feed mixture to a temperature of about 150° C. to 480° C. with the products of combustion of a heating fuel selected from the group consisting of water gas, producer gas, natural gas and mixtures thereof, said products of combustion comprising between about 1.0% by volume to about 6.0% by volume of reducing gases selected from the group consisting of hydrogen, carbon monoxide, and mixtures thereof, to convert said resultant feed mixture to metallic sulfate, ammonia, sulfur, sulfur dioxide and water, while maintaining evolved sulfur and sulfur dioxide in a molar ratio of about 1 to 1 and to maintain evolved ammonia and produced metallic sulfate in a molar ratio of about 1 to 1;

(d) removing the metallic sulfate from the lower portion of said reactor and passing said removed metallic sulfate to a quench zone where the sulfate is dissolved in water to form a metallic sulfate solution;

(e) sweeping carbon dioxide, evolved sulfur, sulfur dioxide and ammonia out of the upper portion of said reactor;

(f) passing the swept out gases into a first absorption zone where the sulfur dioxide and a portion of the ammonia are dissolved and reacted to form an ammonium thiosulfate solution; and (g) passing the remaining gases from the first absorption zone to a second absorption zone where the remaining ammonia and the carbon dioxide are scrubbed with water and react to form an ammonium carbonate solution.

* * * * *